(12) United States Patent
Sattler et al.

(10) Patent No.: US 6,893,248 B2
(45) Date of Patent: May 17, 2005

(54) HELICAL HEATING ELEMENT FOR AN INJECTION MOULDING DEVICE

(75) Inventors: Peter Sattler, Zwingenberg (DE); Udo Liebram, Pfungstadt (DE)

(73) Assignee: Synventive Molding Solutions B.V., 'S-Gravendeel (NL)

( * ) Notice: Subject to any disclaimer, the term of this patent is extended or adjusted under 35 U.S.C. 154(b) by 154 days.

(21) Appl. No.: 10/301,673

(22) Filed: Nov. 22, 2002

(65) Prior Publication Data

US 2003/0124215 A1 Jul. 3, 2003

(30) Foreign Application Priority Data

Nov. 22, 2001 (EP) .............................. 01204473

(51) Int. Cl.$^7$ .............................................. B29C 45/20
(52) U.S. Cl. ................... 425/549; 264/328.15
(58) Field of Search ....................... 425/549; 264/328.15

(56) References Cited

U.S. PATENT DOCUMENTS 4,730,937 A    3/1988    Hehl
5,360,333 A * 11/1994    Schmidt ................... 425/549

FOREIGN PATENT DOCUMENTS

| DE | 297 18 789 U1 | 12/1997 |
| EP | 0 444 748 A1 | 9/1991 |
| FR | 2 620 953 | 3/1989 |

* cited by examiner

*Primary Examiner*—Tim Heitbrink
(74) *Attorney, Agent, or Firm*—Young & Thompson

(57) ABSTRACT

An injection moulding device includes an elongated nozzle having a central bore, a forward end with an outlet for supplying molten thermoplastic material via the bore and the outlet to a cavity, and a heating element around the nozzle, the heating element having a rear end and a forward end and being helically wound around and supported by the nozzle. The helical windings of the heating element are substantially unrestrained in a circumferential direction of the nozzle, wherein one of the ends of the heating element can be radically displaced around the nozzle in a circumferential direction.

10 Claims, 1 Drawing Sheet

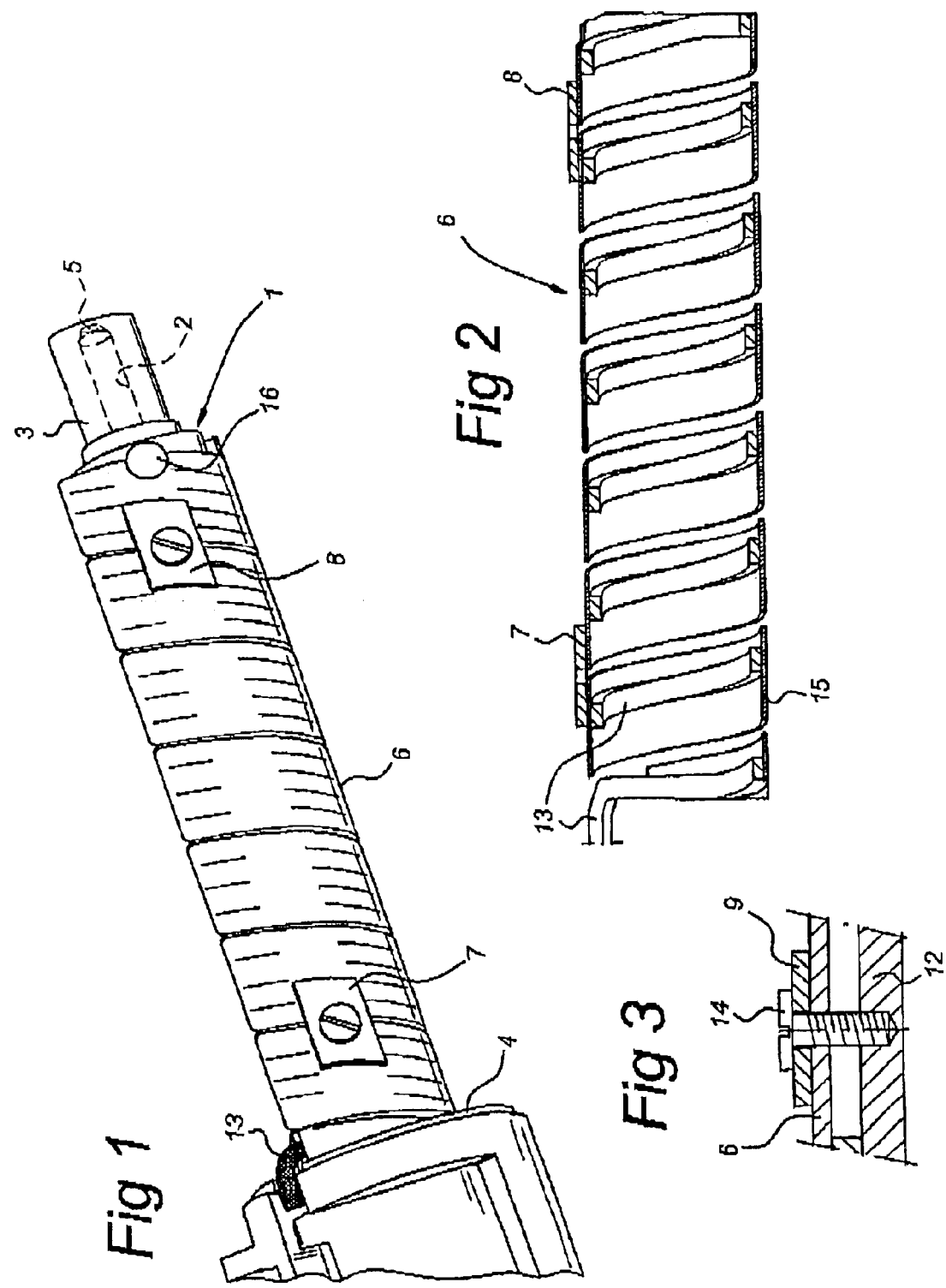

HELICAL HEATING ELEMENT FOR AN INJECTION MOULDING DEVICE

BACKGROUND OF THE INVENTION

The invention relates to an injection moulding device comprising an elongated nozzle having a central bore, a forward end with an outlet for supplying molten thermoplastic material via the bore and the outlet to a cavity, and a heating element around the nozzle, the heating element having a rear end and a forward end and being helically wound around and supported by the nozzle.

DESCRIPTION OF THE RELATED ART

Such an injection moulding device and heating element are known from E-P-A-0 444 748. In the known injection moulding device, the helically wound heating element is embedded in a solid metal body which is axially placed around the nozzle in a close fitting manner. By using a number of tubular heating bodies around the nozzle, a specific heat distribution in the axial direction can be achieved. Alternatively, a tubular heating element is formed comprising zig-zag loops of the heating coil embedded in a metal leaving an axial slit. The heating element which is fitted around the nozzle in an axial manner and is positioned by a clamping sleeve. The above heating elements are relatively complex and require either close tolerances to be placed in heat conducting contact with the nozzle or external clamping devices extending along the axial length of the heating element. It is therefore an object of the present invention to provide a heating element which can be easily placed around the nozzle and which can be placed along its length in close heating conducting contact with the nozzle.

SUMMARY OF THE INVENTION

Thereto the injection moulding device according to the present invention is characterised in that the helical windings of the heating element are substantially unrestrained in a circumferential direction of the nozzle, wherein one of the ends of the heating element can be radially displaced around tie nozzle in a circumferential direction.

Because the helically wound heating element of the present invention is substantially unrestricted in the axial direction, it can be tightly placed around the nozzle by rotation of the end parts in opposite circumferential directions. Upon installation, the helically wound heating element may have a large diameter when it is slid around a nozzle. Then the forward or rearward ends may be released, such that the heating element contracts to a small diameter. Both ends may then be fixed against the nozzle while one end may be rotated around the nozzle until the required clamping force is obtained in an optional tightening step.

According to one embodiment, the forward and/or rearward end or the whole helically wound heating element may comprise elastically deformable, spring type properties such that the heating element tries to assumes a diameter which is smaller tan that of the nozzle such that the clamping force is generated.

In another embodiment the heating element may comprise a bi-metal element such that the diameter of the helically wound heating element decreases upon arise of temperature of the heating element. Suitable bi-metal elements may comprise a metal with a low coefficient of thermal expansion, such as titanium, alloys or stainless steel, combined with a metal having a high coefficient of thermal expansion, such as copper, In this embodiment the heating element is self-clamping and need not employ separate fixation elements such that the quick and easy fitting and/or exchange can be achieved.

Preferably the heating element has a helically wound metal strip and a heating wire positioned against said strip, the heating wire being relatively narrow compared to the strip. The heating wire and metal strip form the components of the bi-metal clamping member described above. The metal strip provides a broad heat conducting surface against the nozzle for efficient heat transfer that can be effectively clamped around the nozzle without additional tightening means in view of its spring type action.

BRIEF DESCRIPTION OF THE DRAWINGS

The invention will be explained in detail with reference to the accompanying drawings in which:

FIG. 1 shows a perspective schematic view of an injection moulding nozzle comprising a helically wound heating element according to the present invention;

FIG. 2 shows a cross-sectional view of the heating element of FIG. 1; and

FIG. 3 shows a detail of the fixation of the heating element via a clamping member.

DESCRIPTION OF THE PREFERRED EMBODIMENTS

FIG. 1 shows a nozzle 1 of an injection moulding device with a central tubular part having a central bore 2, which at a forward end 3 ends in outlet 5. The outlet 5 is communicating with a mould cavity for injection of thermoplastic material into said cavity at raised temperatures, which may reached over 200° C. Around the metal nozzle 1 a heating element 6 is helically wound to be close in heat conducting contact with the metal nozzle body. At the forward end 3 and rearward end 4 of the nozzle, the helically wound heating element 6 is fixed to the nozzle via fixation members 7, 8 which may for instance comprise a clamping plate 9 (see FIG. 3) which is attached to the nozzle wall 12 via a screw 14. By rotating the forward end and rearward end 3, 4 of the heating element 6 in an opposite circumferential direction around the nozzle 1, a clamping force is exerted and close heat conducting contact is established. The axial position of the heating element 6 may be secured by supporting the lower end 3 on a heat sensor 16 such as a thermocouple, or other protrusion FIG. 2 shows a cross-sectional view in which the heating element 6 can be seen to comprise a relatively broad strip-like material 15, for instance made of sheet metal and connected thereto an heating wire 13 which is relatively narrow, for instance a flat copper wire. The strip metal 15 and the heating wire 13 may have different thermal expansion coefficients such that a bi-metal effect is achieved which tightens the heating element around the nozzle. The fixation members 7, 8 may be attached to the outer surface of the heating element 6.

In an alternative embodiment, the strip members 15 and the heating wire 13 have spring-type properties such that a large diameter of the heating element may be achieved upon introduction around the nozzle 1 whereas upon release the helical windings are tightened around the nozzle 1 to exert the desired clamping force without the use of any additional clamping members 7, 8.

The helical heating element of the present invention can be easily fit to different lengths of nozzles and forms a compact and simple heating member. Release and exchange of the heating element is easy and can be rapidly completed.

What is claimed is:

1. Injection moulding device comprising an elongated nozzle (1) having a central bore, a forward end (3) with an outlet (5) for supplying molten thermoplastic material via the bore and the outlet to a cavity, and a heating element (6) around the nozzle, the heating element having a rear end and a forward end and being helically wound around and supported by the nozzle, characterised in that the helical windings of the heating element are substantially unrestrained in a circumferential direction of the nozzle, wherein one of the ends of the heating element can be radially displaced around the nozzle in a circumferential direction, and wherein the heating element comprises a bi-metal element, the diameter of the helically wound heating element decreasing upon a rise of temperature of the heating element.

2. Injection molding device according to claim 1, wherein a diameter of the heating element is increased by twisting the forwarded end in an opposite direction compared to the rearward end to be axially slid onto the nozzle, and the diameter is reduced when the forwarded end is released relative to the rearward end.

3. Injection moulding device according to claim 1, wherein the heating element comprising a clamping end, which clampingly engages the nozzle.

4. Injection moulding device according to claim 1, wherein the heating element (6) comprising a helically wound metal strip (15) and a heating member (13) positioned against said strip, the heating member (13) being relatively narrow compared to the strip.

5. Injection moulding device according to claim 1, wherein the heating element comprising an elastically deformable spring-type material.

6. Injection moulding device according to claim 2, wherein the heating element comprising a clamping end, which clampingly engages the nozzle.

7. Injection moulding device according to claim 2, wherein the heating element (6) comprising a helically wound metal strip (15) and a heating member (13) positioned against said strip, the heating member (13) being relatively narrow compared to the strip.

8. Injection moulding device according to claim 3, wherein the heating element (6) comprising a helically wound metal strip (15) and a heating member (13) positioned against said strip, the heating member (13) being relatively narrow compared to the strip.

9. Injection moulding device according to claim 2, wherein the heating element comprising an elastically deformable spring-type material.

10. Injection moulding device according to claim 4, wherein the heating element comprising an elastically deformable spring-type material.

* * * * *